United States Patent [19]

Hoen

[11] Patent Number: 4,652,615

[45] Date of Patent: * Mar. 24, 1987

[54] POLYMER COMPOSITION

[75] Inventor: Johannes Hoen, Sittard, Netherlands

[73] Assignee: Stamicarbon B.V., Geleen, Netherlands

[*] Notice: The portion of the term of this patent subsequent to Dec. 24, 2002 has been disclaimed.

[21] Appl. No.: 583,040

[22] Filed: Feb. 23, 1984

Related U.S. Application Data

[63] Continuation-in-part of Ser. No. 441,859, Nov. 15, 1982, abandoned.

[30] Foreign Application Priority Data

| Nov. 11, 1982 [FI] | Finland | 823872 |
| Nov. 12, 1982 [DK] | Denmark | 5045/82 |
| Nov. 12, 1982 [EP] | European Pat. Off. | 82201431.2 |
| Nov. 12, 1982 [NO] | Norway | 823799 |
| Nov. 12, 1982 [ES] | Spain | 517314 |

[51] Int. Cl.$^4$ .................... C08L 33/08; C08L 51/00
[52] U.S. Cl. ........................ 525/85; 524/504; 525/76; 525/80; 525/84
[58] Field of Search .......... 525/80, 84, 85, 76; 524/504

[56] References Cited

U.S. PATENT DOCUMENTS

| 3,010,936 | 11/1961 | Irving | 525/86 |
| 3,111,501 | 11/1963 | Thompson | 525/86 |
| 4,404,323 | 9/1983 | van der Lous et al. | 525/86 |

Primary Examiner—Jacob Ziegler
Attorney, Agent, or Firm—Cushman, Darby & Cushman

[57] ABSTRACT

Thermoplastic polymer compositions consisting essentially of 50 to 75 parts by weight of a graft copolymer or styrene, α-methylstyrene and acrylonitrile on a rubber and 25 to 50 parts by weight of a copolymer of α-methylstyrene and acrylonitrile (ABS polymers) are described. Molded articles fabricated partially or wholly from the polymer compositions are also referred to.

14 Claims, No Drawings

POLYMER COMPOSITION

This application is a continuation-in-part of application Ser. No. 441,859, filed Nov. 15, 1982, now abandoned.

This invention relates to a thermoplastic polymer composition consisting essentially of a graft copolymer of styrene, α-methylstyrene and acrylonitrile on a rubber and a copolymer of α-methylstyrene and acrylonitrile (ABS polymers). This invention further relates to molded articles fabricated partially or wholly from the polymer composition.

BACKGROUND OF THE INVENTION

The name ABS is derived from the initial letters of acrylonitrile, butadiene, and styrene, the most conventionally used monomers for the preparation of graft copolymers.

Thermoplastically deformable ABS polymers are heterogeneous plastics consisting of two phases. One phase is essentially obtained by polymerizing styrene and acrylonitrile in the presentce of an elastic substance derived from at least one homopolymer or copolymer of butadiene. This material is dispersed as an internal discontinuous phase in a thermoplastic styrene-acrylonitrile (SAN) copolymer as the matrix. In principle, saturated elastomeric components can also serve as the elastic substance for the discontinuous phase.

The physical properties of ABS polymers are only partially attributable to the properties of their individual monomeric and/or polymeric components. One of the most important and desirable properties, the impact strength, is determined by the two-phase structure formed by the rubber phase embedded in the hard, brittle thermoplastic matrix. The heat resistance of these ABS polymers is inadequate, however, for a number of applications, particularly for the motor industry and for household and electrical appliances.

The replacement of styrene by α-methylstyrene in ABS is known from U.S. Pat. No. 3,594,453.

Furthermore it is known from a number of publications that the partial or total replacement of styrene by α-methylstyrene in SAN has a beneficial effect on the heat resistance. For example, U.S. Pat. No. 3,010,936 discloses a polymer composition based on a copolymer of α-methylstyrene and acrylonitrile or a terpolymer of αmethylstyrene, styrene and acrylonitrile mixed with a copolymer of styrene and acrylonitrile onto a butadiene rubber. The polymer composition disclosed therein achieves a sufficient degree of heat resistance by requiring a relatively large proportion of copolymer or terpolymer. The composition thereby suffers, however, because this requirement results in an unacceptably low level of impact strength. Moreover, the flow properties of such polymer compositions are very poor.

U.S. Pat. No. 3,111,501 discloses a polymer composition consisting of 68–85% of a copolymer of α-methylstyrene and acrylonitrile and 32–15% of a copolymer of 40–50 parts by weight of styrene and acrylonitrile grafted onto 60–50 parts by weight of polybutadiene. This polymer composition also exhibits very poor flow behaviour, caused by the high rubber content of the graft copolymer and the high percentage of copolymer which exhibits poor flow.

British Pat. No. 1,390,973 describes mixtures of ABS, SAN, and a copolymer of α-methylstyrene and acrylonitrile. According to this patent, problems relating to the flow behaviour of a mixture of ABS and a copolymer of α-methylstyrene and acrylonitrile can be overcome by adding SAN to the mixture. The improvement actually achieved, however, is fairly limited since it occurs at the expense of the heat resistance and impact strength of the composition.

U.S. Pat. No. 4,404,323 relates to a heat resistant polymer composition based on a graft copolymer obtained by polymerizing 50–80 parts by weight of a monomer mixture consisting of 20–40 % by weight of acrylonitrile, 50–80 % by weight of styrene and 0–30 % by weight of one or more other monomers in the presence of 20–50 parts by weight of rubber and a copolymer of α-methylstyrene and acrylonitrile obtained by polymerizing a mixture of 60–80 parts by weight of α-methylstyrene and 20–40 parts by weight of acrylonitrile, of which copolymer the spiral flow length is at least 65 and the flow index 45 at most, and the ratio between spiral flow length and the flow index is at least 3.0 and in which polymer compositions 35 to 80 % by weight of copolymer of α-methylstyrene and acrylonitrile is present.

The copending U.S. patent application Ser. No. 534,635, filed Sept. 23, 1983 relates to a polymer composition based on one or more graft copolymers of styrene and acrylonitrle on a rubber and a copolymer of α-methylstyrene and acrylonitrile. This polymer composition comprises one or more graft copolymers, obtained by polymerizing 20–80 parts by weight of a monomer mixture consisting of 20–40 % by weight of acrylonitrile, 50–80 % by weight of styrene and 0–30 % by weight of one are more other monomers in the presence of 20–80 parts by weight of rubber and one or more graft copolymers. obtained by polymerizing 75–90 parts by weight of a monomer mixture consisting of 20–40 % by weight of acrylonitrile. 50–80 % by weight of styrene, and 0–30 % by weight of one or more other monomers in the presence of 10–25 parts by weight of rubber and a copolymer of α-methylstyrene and acrylonitrile obtained by polymerizing 60–80 parts by weight of α-methylstyrene and 20–40 parts by weight of acrylonitrile, of which polymer composition the rubber content is between 10 and 30 % by weight, while the difference in rubber content of the graft copolymers is at least 5 % by weight.

For many applications that require ABS having improved flow properties, the reduced heat resistance that also results is still adequate. These are the so-called medium-heat ABS grades. However, the impact strength of the polymer composition of the above-mentioned German patent is so modest, particularly at low temperatures, that the range of applications is in practice very limited.

The object of the present invention is, therefore, to provide a polymer composition which exhibits better heat resistance than a graft copolymer of styrene and acrylonitrile on rubber, and which possesses a very high impact strength, particularly at low temperatures.

THE INVENTION

The polymer composition of this invention consists essentially of:
A. 50–75 parts by weight, based on the composition, of a graft copolymer obtained by polymerizing
1. 60–70 parts by weight, based on the graft copolymer, of a monomer mixture consisting of:
   a. 20–40 weight % of acrylonitrile, b. 40–80 weight % of styrene and α-methylstyrene in a weight ratio styrene/α-methylstyrene between 10:1 and 2:1 and c. 0–30 weight % of at least one other monomer, wherein each of the preceding a, b, and c weight %'s are based on monomer mixture, in the presence of 2. 30–40 parts by weight, based on the graft copolymer, of rubber, and B. 25–50 parts by weight, based on said composition, of a copolymer obtained by polymerizing a mixture of 1. 20–40 weight % of acrylonitrile, and 2. 60–80 weight % of α-methylstyrene, wherein each of the preceding (1 and 2) weight %'s are based on said mixture and wherein said composition contains a total of at least 15 weight % of rubber.

In addition, conventional ABS polymer additives may be present in an amount up to 10 parts by weight, based on the composition.

The compatibility between the graft polymer consisting of acrylonitrile, styrene, α-methylstyrene and polybutadiene and the copolymer consisting of α-methylstyrene and acrylonitrile is very good. This is in contrast with the compatability between a graft copolymer consisting of only acrylonitrile. styrene and polybutadiene and the copolymer consisting of α-methylstyrene and acrylonitrile.

Surprisingly, it has been found that this composition exhibits relatively high heat resistance together with a very high impact strength, particularly at low temperatures. This is of particular importance for complicated products such as car fronts.

The impact strength of products made from polymer compositions in accordance with the invention even approaches that of ordinary high-impact ABS. The latter product, however, has a heat resistance that is inadequate for many applications, as previously mentioned.

According to a preferred embodiment the polymer composition consists essentially of:

A. 50–75 parts by weight, based on said composition, of a graft copolymer obtained by polymerizing 1. 62.5–70 parts by weight based on the graft copolymer, of a monomer mixture consisting of:

a. 20–40 weight % of acrylonitrile, b. 40–80 weight % of styrene and α-methylstyrene in a weight ratio of between 10 : 1 and 2 : 1, and c. 0–30 weight % of at least one other monomer, in the presence of 2. 30–37.5 parts by weight, based on the weight of the graft copolymer, of rubber, and B. 25–50 parts by weight, based on said composition, of a copolymer obtained by polymerizing a mixture of:

1. 20–40 weight % of acrylonitrile, and 2. 60–80 weight % of α-methylstyrene. wherein said composition contains a total of at least 15 weight % of rubber.

The proposed polymer composition is preferably chosen such that the total rubber content is at least 20 weight %. Generally, however, the total rubber content should not exceed 24 weight %.

The total quantity of copolymer in the composition should generally not exceed 50 weight %.

In accordance with a preferred embodiment, the quantity of the copolymer is between 38 and 47 weight %.

According to a preferred embodiment, the rubber content of the graft copolymer is between 30 and 36%.

The graft copolymer is made by polymerizing styrene, α'-methylstyrene and acrylonitrile in the presence of rubber. It may be advantageous to prepare the graft copolymer by polymerizing a mixture consisting of 25–35 weight % of acrylonitrile, 40–70 weight % of styrene, and 5–30 weight % of α-methylstyrene in the presence of a rubber. The graft copolymer may be prepared by any of the various known polymerization techniques such as emulsion, suspension, bulk, and solution polymerization, or by combinations of these, such as bulk-suspension, emulsion-bulk, and emulsion-suspension polymerization.

The copolymer of α-methylstyrene and acrylonitrile is preferably prepared in emulsion, but it is also possible to use the other polymerization techniques mentioned above.

Emulsion polymerization can be performed by the usual techniques, both for the graft copolymer and for the copolymer of α'-methylstyrene and acrylonitrile. If the polymerization is performed in aqueous emulsion it is also necessary to employ other conventional reagents such as emulsifiers, alkali, salts, soaps, initiators such as peroxides, and chain-length regulators.

Suitable chain-length regulators are organosulphur compounds such as mercaptans or dialkyldixanthogens, diaryl sulphides, used singly or in combination, and hydroxyl compounds such as the terpinolenes. The dimer of α-methylstyrene or of an α-alkene with a relatively long chain may also be used.

The chain-length regulators that are most widely used commercially are the mercapto compounds, and of these the hydrocarbyl mercapto compounds having 8–20 carbon atoms per molecule are preferred for use in the present invention. Particularly preference are those mercaptans having a tertiary alkyl group.

The quantity of the organosulphur compound can vary within broad limits depending on the specific compound, specific composition, the polymerization temperature, the emulsifier, and other variables relating to the formulation. Good results can be achieved by using 0.01–5 parts by weight (per 100 parts by weight of the monomers) of the organosulphur compound, 0.05–2 parts by weight being a preferred level. Suitable organosulphur compounds include n-octylmercaptan, n-dodecylmercaptan, tert-dodecylmercaptan, tert-nonylmercaptan, tert-hexadecylmercaptan, tert-octadecylmercaptan, tert-eicosylmercaptan, sec-octylmercaptan, sec-tridecylmercaptan, cyclo-dodecylmercaptan, cyclo-dodecadienylmercaptan, arylmercaptans such as 1-naphthalenethiol, bis(tetramethylthiuram disulphide), 2-mercaptobenzathiazole, and the like. Mixtures of these compounds can also be used.

The emulsifier may be selected from a wide range of compounds such as disproportionated rosin soap, fatty acid soap, mixtures thereof, acrylsulphonates, alkylarylsulphonates and other surfaceactive compounds, and mixtures of these compounds. Non-ionic emulsifiers such as polyethers and polyols may also be used. The quantities of the emulsifiers that are used depend on the types and concentrations of the polymerizable monomers in the emulsion polymerization system and on the reaction parameters.

Suitable donors of free radicals for the emulsion polymerization process are organic or inorganic peroxides, hydroperoxides, azo compounds and redox initiator systems. These compounds can be added at the start of the polymerization. Alternatively, they may be added partly at the start and partly during the course of the polymerization.

The compounds chosen as initiators are preferably the alkali metal or ammonium per-salts and/or redox systems. Particular per-salts that may be employed are potassium persulphate, ammonium persulphate, and sodium persulphate. Examples of suitable redox systems are persalts (for example perchlorates or persulphates), tert-butyl hydroperoxide, cumene hydroperoxide, diisopropylbenzene hydroperoxide, and methylcyclohexyl hydroperoxide, in combination with reducing agents based on acids that contain sulphur in a low valency state, such as sodium formaldehydesulphoxylate, bisulphide and pyrosulphide, or with organic bases such as triethanolamine, or with dextrose, sodium pyrophosphate, and mercaptans or their combinations, possibly together with metal salts such as ferrous sulphate. The initiators or initiator systems may be added as a single shot, in a number of stages, or even gradually but continuously.

In cases wherein $\alpha$-methylstyrene-acrylonitrile copolymers are prepared by suspension polymerization, customary suspension stabilizers may be used such as polyvinyl alcohol, partially hydrolysed polyvinyl acetate, or sparingly soluble metal phosphates.

If required, the copolymer may contain small quantities of one or more other monomers. These quantities preferably amount to less than 20 weight % based on the copolymer, and most preferably less than 5 weight %.

A description of a copolymer that may be used as component B in the polymer composition is given in the European Patent Application No. 44.101.

The hydrocarbon-based rubber used for the preparation of the graft copolymers may in principle be of any type. However, it is advantageous to use butadiene-based rubbers such as polybutadiene and butadiene-styrene rubber, which are preferred. To obtain a polymer composition having a good impact resistance it is desirable to use a rubber latex having a weight-average particle size ($d_{50}$, determined with an electron microscope) between 0.50 and 0.70 $\mu$m. In this case the graft copolymer must be prepared at least partly in emulsion.

It is preferred to use polybutadiene homo-polymers or butadiene copolymers having a butadiene content of more than 60 weight %. If other dienes, such as isoprene or the lower alkyl esters of acrylic acid, are used as comonomers, the butadiene content of the rubber may be lowered to 30 weight % without producing adverse effects on the properties of the polymer composition. In principle, it is also possible to prepare the graft polymer of the invention from saturated rubbers such as ethene-vinyl acetate copolymers having a vinyl acetate content not exceeding 50%, ethene-propene-diene terpolymers (these dienes are not conjugated; an example would be a terpolymer containing 1,4-hexadiene, ethylidene norbornene and dicyclopentadiene), acrylate rubber, clorinated polyethylene or chloroprene rubber. Mixtures of two or more rubbers can also be used.

The process by which the rubber latex is prepared is preferably controlled in such a way that highly cross-linked products are obtained. The gel content should preferably be greater than 70 weight % as determined in methyl ethyl ketone or toluene. At high levels of butadiene in the rubber this degree of cross-linking can be obtained by polymerizing to a high degree of conversion or by using cross-linking agent, i.e. polyfunctional monomers such as divinylbenzene or ethylene glycol dimethylacrylate.

If the graft copolymerization is performed by a method not involving emulsion polymerization, rubbers that are made from solutions in organic solvents may also be used. In that case, however, it is desirable to perform the graft polymerization, for example, as a bulk-suspension process.

In cases wherein the rubbers are prepared by emulsion polymerization, the same emulsifiers, activators, and polymerization auxiliaries that are used in the preparation of the $\alpha$-methylstyrene acrylonitrile copolymers can be used. Before the grafting reaction occurs the rubber latex should be degassed to prevent undesirable reactions of unconverted monomer.

The polymer composition may generally contain the usual additives conventionally employed in ABS polymer compositions, such as antioxidants, pigments, processing agents, (reinforcing) fillers, antistatics, fire retardants, UV-stabilisers, and the like.

Finally, the invention also relates to an article that is partially or completely made from the polymer composition described above.

The invention will now be illustrated by the following non-limiting examples.

EXAMPLES

A. The Graft Copolymer 35 parts by weight of a polybutadiene rubber, 45.5 parts by weight of styrene and $\alpha$-methylstyrene in a weight ratio styrene/$\alpha$-methylstyrene of 4 : 1, 19.5 parts by weight of acrylonitrile and 0.2 parts by weight of tert. dodecylmercaptane were all added to a reactor containing 135 parts by weight of water and 2.0 parts by weight of a 15 weight % wood-rosin emulsifier solution.

After heating the reactor contents to approximately 45° C., 0.4 parts by weight of cumenehydroperoxide and activator system were added, and the polymerization started. Due to the heat generated during the reaction, the temperature of the reactor contents increased to 90° C.

Thereafter, the reaction contents was slowly cooled, and the latex of graft copolymer was coagulate with MgSO$_4$, washed, filtered and dried.

B. The copolymer

A copolymer of acrylonitrile and $\alpha$-methylstyrene was prepared in a 100-liter reactor with a rapid stirrer (tip speed 5.1 m/s). Under nitrogen, the reactor was filled with 56 l oxygen-free deionized water, in which 45 g KOH and 485 g rosin soap were dissolved. Subsequently, 7.77 kg acrylonitrle, 16.51 kg $\alpha$-methylstyrene and 228 g tert-dodecyl mercaptan (TDDM) were supplied. With continuous stirring, the reaction mixture was heated to 50° C., after which 152 g potassium persulphate (KPS) dissolved in 5 l deionized oxygen-free water was added. For 30 minutes the temperature was kept constant at 50° C., after which in 90 minutes the polymerization temperature was gradually raised to a value between 85° C. and 95° C.

105 minutes after raising the temperature, another 152 g KPS dissolved in 5 l water was added to the reaction mixture. Subsequently, the temperature was kept constant for another 30 minutes, after which the raction mixture was cooled to 60° C in 60 minutes, and was discharged.

Thereafter, the resulting latex was coagulated with MgSO₄, washed, filtered and dried.

C.

A number of compositions were prepared on the basis of the graft copolymer obtained under A, blended with the copolymer, obtained under B.

The compositions were prepared by mixing the two components together with antioxidant and lubricant in a highspeed impeller mixer. The resulting mixture was fed to a single screw extruder. From the extruder the composition was obtained as granulate. From this granulate test bars were injection moulded.

The following table gives the compositions obtained, together with their mechanical properties.

| Example | Graft copolymer, parts by weight | Copolymer, parts by weight | Izod[1] (+23° C.) KJ/m² | HDT[2] (ann.) °C. |
|---|---|---|---|---|
| 1 | — | 100 | 2 | 117 |
| 2 | 40 | 60 | 14 | 111 |
| 3 | 46 | 54 | 32 | 110 |
| 4 | 50 | 50 | 35 | 108 |
| 5 | 60 | 40 | 44 | 106 |
| 6 | 65 | 35 | 44 | 104 |
| 7 | 100 | — | 45 | 94 |

[1]The notched impact resistance is measured according to ASTM D 256, at 23° C.
[2]The heat distortion temperature (annealed) is measured according to ASTM 648.

What is claimed is:

1. A polymer composition, based on a graft copolymer of styrene, α-methylstyrene and acrylonitrile on a rubber and a copolymer of α-methylstyrene and acrylonitrile, which consists essentially of:
   A. 50–75 parts by weight, based on said composition, of a graft copolymer obtained by polymerizing
      1. 60–70 parts by weight, based on the graft copolymer, of a monomer mixture consisting of:
         a. 20–40 weight % of acrylonitrile,
         b. 40–80 weight % of styrene and α-methylstyrene in a weight ratio styrene/α-methylstyrene between 10:1 and 2:1
         c. 0–30 weight % of at least one other monomer, in the presence of
      2. 30–40 parts by weight, based on the weight of the graft copolymer, of rubber, and
   B. 25–50 parts by weight, based on said composition, of a copolymer obtained by polymerizing a mixture of:
      1. 20–40 weight % of acrylonitrile, and
      2. 60–80 weight % of α-methylstyrene, wherein said composition contains a total of at least 15 weight % of rubber.

2. The polymer composition of claim 1, wherein said graft copolymer is obtained by polymerizing a monomer mixture consisting of 25–35 weight % of acrylonitrile, 40–70 weight % of styrene, and 5–30 weight % of α-methylstyrene in the presence of said rubber.

3. The polymer composition of claim 1 further consisting essentially of up to 10 parts by weight, based on said composition, of one or more additives selected from the group consisting of antioxidants, pigments, processing agents, fillers, antistatic agents, and fire retardants.

4. The polymer composition of claim 1, wherein the total amount of rubber present in said composition is at least 20 weight %.

5. The polymer composition of claim 1, wherein said composition contains 38 to 47 weight % of copolymer B.

6. The polymer composition of claim 1, wherein said rubber consists of at least one rubber selected from the group consisting of polybutadiene, styrene-butadiene rubber, butadiene-acrylonitrile rubber, acrylate rubber, ethene-propene(diene) rubber, chloroprene rubber, and ethene-vinyl acetate copolymers.

7. An article fabricated at least in part from the polymer composition of claim 1.

8. A polymer composition, based on a graft copolymer of styrene, α-methylstyrene and acrylonitrile on a rubber and a copolymer of α-methylstyrene and acrylonitrile, which consists essentially of:
   A. 50–75 parts by weight, based on said composition, of a graft copolymer obtained by polymerizing
      1. 62.5–70 parts by weight, based on the graft copolymer, of a monomer mixture consisting of:
         a. 20–40 weight % of acrylonitrile,
         b. 40–80 weight % of styrene and α-methylstyrene in a weight ratio styrene/α-methylstyrene between 10:1 and 2:1, and
         c. 0–30 weight % of at least one other monomer, in the presence of
      2. 30–37.5 parts by weight, based on the weight of the graft copolymer, of rubber, and
   B. 25–50 parts by weight, based on said composition, of a copolymer obtained by polymerizing a mixture of:
      1. 20–40 weight % of acrylonitrile, and
      2. 60–80 weight % of α-methylstyrene, wherein said composition contains a total of at least 15 weight % of rubber.

9. The polymer composition of claim 8, wherein said graft copolymer is obtained by polymerizing a monomer mixture consisting of 25–35 weight % of acrylonitrile, 40–70 weight % of styrene, and 5–30 weight % of α-methylstyrene in the presence of said rubber.

10. The polymer composition of claim 8 further consisting essentially of up to 10 parts by weight, based on said composition, of one or more additives selected from the group consisting of antioxidants, pigments, processing agents, fillers, antistatic agents, and fire retardants.

11. The polymer composition of claim 8, wherein the total amount of rubber present in said composition is at least 20 weight %.

12. The polymer composition of claim 8, wherein said composition contains 38 to 47 weight % of copolymer B.

13. The polymer composition of claim 8, wherein said rubber consists of at least one rubber selected from the group consisting of polybutadiene, styrene-butadiene rubber, butadiene-acrylonitrile rubber, acrylate rubber, ethene-propene(diene) rubber, chloroprene rubber, and ethene-vinyl acetate copolymers.

14. An article fabricated at least in part from the polymer composition of claim 8.

* * * * *